(12) United States Patent
Amirkhany et al.

(10) Patent No.: US 9,536,495 B2
(45) Date of Patent: Jan. 3, 2017

(54) SYSTEM FOR RELAYED DATA TRANSMISSION IN A HIGH-SPEED SERIAL LINK

(71) Applicant: SAMSUNG DISPLAY CO., LTD., Yongin, Gyeonggi-Do (KR)

(72) Inventors: Amir Amirkhany, Sunnyvale, CA (US); Wei Xiong, Mountain View, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 101 days.

(21) Appl. No.: 14/594,004

(22) Filed: Jan. 9, 2015

(65) Prior Publication Data

US 2015/0221279 A1    Aug. 6, 2015

Related U.S. Application Data

(60) Provisional application No. 61/934,645, filed on Jan. 31, 2014.

(51) Int. Cl.
| | |
|---|---|
| *H04L 25/52* | (2006.01) |
| *G09G 5/00* | (2006.01) |
| *H04L 25/02* | (2006.01) |
| *G09G 3/32* | (2016.01) |

(Continued)

(52) U.S. Cl.
CPC ............ *G09G 5/006* (2013.01); *G09G 3/3266* (2013.01); *G09G 3/3674* (2013.01); *G09G 5/005* (2013.01); *H04J 3/08* (2013.01); *H04L 25/0262* (2013.01); *H04L 25/0264* (2013.01); *G09G 2310/0286* (2013.01); *G09G 2310/0297* (2013.01); *G09G 2310/08* (2013.01); *G09G 2370/08* (2013.01)

(58) Field of Classification Search
CPC  G09G 5/005; G09G 5/006; G09G 2310/0286; G09G 2310/0297; G09G 2310/08; G09G 2370/08; H04L 25/0264
See application file for complete search history.

(56) References Cited

U.S. PATENT DOCUMENTS

2006/0232579 A1  10/2006  Chen et al.
2010/0045655 A1*  2/2010  Jang .................. G09G 3/20
                                                              345/213

(Continued)

FOREIGN PATENT DOCUMENTS

EP        1 499 071 A1    1/2005
KR   10-2006-0000113 A    1/2006

(Continued)

OTHER PUBLICATIONS

EPO Search Report dated Jul. 2, 2015, for corresponding European Patent application 15153167.0, (7 pages).

*Primary Examiner* — David B. Lugo
(74) *Attorney, Agent, or Firm* — Lewis Roca Rothgerber Christie LLP

(57) ABSTRACT

A system for transmitting data from a timing controller (TCON) to several source driver integrated circuits (SICs) in a display. The system is suitable for use either with a high data rate or a low data rate to each of the SICs. The TCON provides a serial data stream to a SIC, which either uses all of the received data, if it requires high rate data, or relays a portion, e.g., half, of the data to another SIC, which then does not require a separate direct connection to the TCON.

19 Claims, 6 Drawing Sheets

(51) Int. Cl.
G09G 3/36 (2006.01)
H04J 3/08 (2006.01)

(56) References Cited

U.S. PATENT DOCUMENTS

| | | | |
|---|---|---|---|
| 2011/0157103 A1* | 6/2011 | Chen | G09G 3/3685 345/204 |
| 2012/0146965 A1* | 6/2012 | Baek | G09G 3/006 345/204 |

FOREIGN PATENT DOCUMENTS

| | | |
|---|---|---|
| KR | 10-2006-0104710 A | 10/2006 |
| KR | 10-2012-0070767 A | 7/2012 |

* cited by examiner

SYSTEM FOR RELAYED DATA TRANSMISSION IN A HIGH-SPEED SERIAL LINK

CROSS-REFERENCE TO RELATED APPLICATION(S)

The present application claims priority to and the benefit of Provisional Application No. 61/934,645, filed Jan. 31, 2014, entitled "SYSTEM FOR RELAYED DATA TRANSMISSION IN A HIGH-SPEED SERIAL LINK", the entire content of which is incorporated herein by reference.

FIELD

One or more aspects of embodiments according to the present invention relate to data transmission in a display, and more particularly to a system for transmitting data cost-efficiently in both low-end and high-end displays.

BACKGROUND

A video display may include a display panel including an array of pixels and circuitry for driving the pixels, which may include one or more source driver integrated circuits (source driver ICs or SICs). The driver ICs may receive data, such as pixel values to be displayed, from another integrated circuit referred to as a timing controller (TCON). Connections between the TCON and the SICs may be one or more serial data links, carried, for example, in one or more cables, each cable having one or more connectors. The cost of fabricating such cables may be significant.

Display devices may be produced in a range of grades, with high-end displays, for example, providing more pixels, greater color depths, or higher refresh rates, than low-end displays, and a high-end display therefore requiring a higher data rate between the TCON and each SIC than a low-end display. It may be possible to reduce manufacturing costs by using the same parts on both high-end and low-end displays.

Thus, there is a need for a system (e.g., a flexible system), for sending serial data between integrated circuits, that is suitable for different data rates.

SUMMARY

Aspects of embodiments of the present disclosure are directed toward a system for transmitting data from a timing controller (TCON) to several source driver integrated circuits (SICs) in a display. The system is suitable for use either with a high data rate or a low data rate to each of the SICs. The TCON provides a serial data stream to a SIC, which either uses all of the received data, if it requires high rate data, or relays a portion, e.g., half, of the data to another SIC, which then does not require a separate direct connection to the TCON.

According to an embodiment of the present invention, there is provided a system for transmitting data, the system including a first source driver integrated circuit relay circuit (a first SIC relay circuit) including: a first data demultiplexer including: a data input; a select input; a first output; and a second output, the first data demultiplexer being to: transmit data from the data input of the first data demultiplexer to either: the first output of the first data demultiplexer or the second output of the first data demultiplexer, depending on a logic value at the select input of the first data demultiplexer; a first programmable delay module including: a first delay input; and a first delay output, the first delay input being connected to the first output of the first data demultiplexer; a data output; and a first relay demultiplexer including: a select input; a data input; a first output; and a second output, the data input of the first relay demultiplexer being connected to the second output of the first data demultiplexer, the first output of the first relay demultiplexer being connected to the data output of the SIC relay circuit, the first relay demultiplexer being to: transmit data from the input of the first relay demultiplexer to either: the first output of the first relay demultiplexer or the second output of the first relay demultiplexer, depending on a logic value at the select input of the first relay demultiplexer.

In one embodiment, the first SIC relay circuit is to transmit, from the data output of the first SIC relay circuit, data at a rate equal to a data rate of data received at the data input of the first data demultiplexer.

In one embodiment, the first SIC relay circuit is to transmit, from the data output of the first SIC relay circuit, data at a rate less than a data rate of data received at the data input of the first data demultiplexer.

In one embodiment, the first SIC relay circuit is to transmit, from the data output of the first SIC relay circuit, data at a rate equal to one half of the data rate of data received at the data input of the first data demultiplexer.

In one embodiment, the programmable delay module includes a shift register.

In one embodiment, the programmable delay module includes an on-chip memory.

In one embodiment, the first SIC relay circuit further includes a first sampler connected to the input of the first data demultiplexer and a first analog front end connected to the first sampler.

In one embodiment, the first SIC relay circuit further includes a first SIC output driver connected to the second output of the first relay demultiplexer.

In one embodiment, the system includes a timing controller transmitter (TCON transmitter) connected to the first analog front end.

In one embodiment, the TCON transmitter includes: a serializer; a TCON multiplexer connected to the serializer; a multiplexer select block connected to the TCON multiplexer; and a TCON output driver connected to the TCON multiplexer, the output driver of the TCON transmitter being connected to the first analog front end.

In one embodiment, the first relay demultiplexer includes a select input, and wherein the first relay demultiplexer is to: transmit data from the input of the first relay demultiplexer to the first output of the first relay demultiplexer when the select input has a first logic value, and transmit data from the input of the first relay demultiplexer to the second output of the first relay demultiplexer when the select input has a second logic value different from the first logic value.

In one embodiment, a printed wiring board (PWB) includes an integrated circuit including a system for transmitting data wherein the select input of the first relay demultiplexer is hard-wired to a conductor on the printed wiring board, to provide the first logic value or the second logic value.

In one embodiment, the first SIC relay circuit further includes a first demultiplexer select block to control the first data demultiplexer.

In one embodiment, the TCON is to transmit, during an initialization sequence, a designated sequence of bits.

In one embodiment, the first demultiplexer select block is to receive, and synchronize to, the designated sequence of bits.

In one embodiment, the system includes: a first input connected to the first delay output; a second input; and an output; and wherein the system further includes a second SIC relay circuit including: a second data demultiplexer including: a data input; a select input; a first output; and a second output, the second data demultiplexer being to: transmit data from the input of the second data demultiplexer to either: the first output of the second data demultiplexer or the second output of the second data demultiplexer, depending on a logic value at the select input of the second data demultiplexer; a second programmable delay module including: a second delay input; and a second delay output, the second delay input being connected to the first output of the second data demultiplexer; a second deserializer including: a first input connected to the second delay output; a second input; and an output; a second relay demultiplexer including: a select input; a data input; a first output; and a second output, the data input of the second relay demultiplexer being connected to the second output of the second data demultiplexer, the first output of the second relay demultiplexer being connected to the second input of the second deserializer, the second relay demultiplexer being to: transmit data from the input of the second relay demultiplexer to either: the first output of the second relay demultiplexer or the second output of the second relay demultiplexer, depending on a logic value at the select input of the second relay demultiplexer; a second sampler connected to the input of the second data demultiplexer; and a second analog front end, the first SIC output driver being connected to the second analog front end.

In one embodiment, the first relay demultiplexer is to transmit data from the input of the first relay demultiplexer to the second output of the first relay demultiplexer and the second relay demultiplexer is to transmit data from the input of the second relay demultiplexer to the first output of the second relay demultiplexer.

In one embodiment, the output driver of the TCON transmitter is not directly connected to the second analog front end.

In one embodiment, a display includes: a timing controller (TCON); a SIC; and a system for transmitting data.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a system for relayed data transmission in a high-speed serial link provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
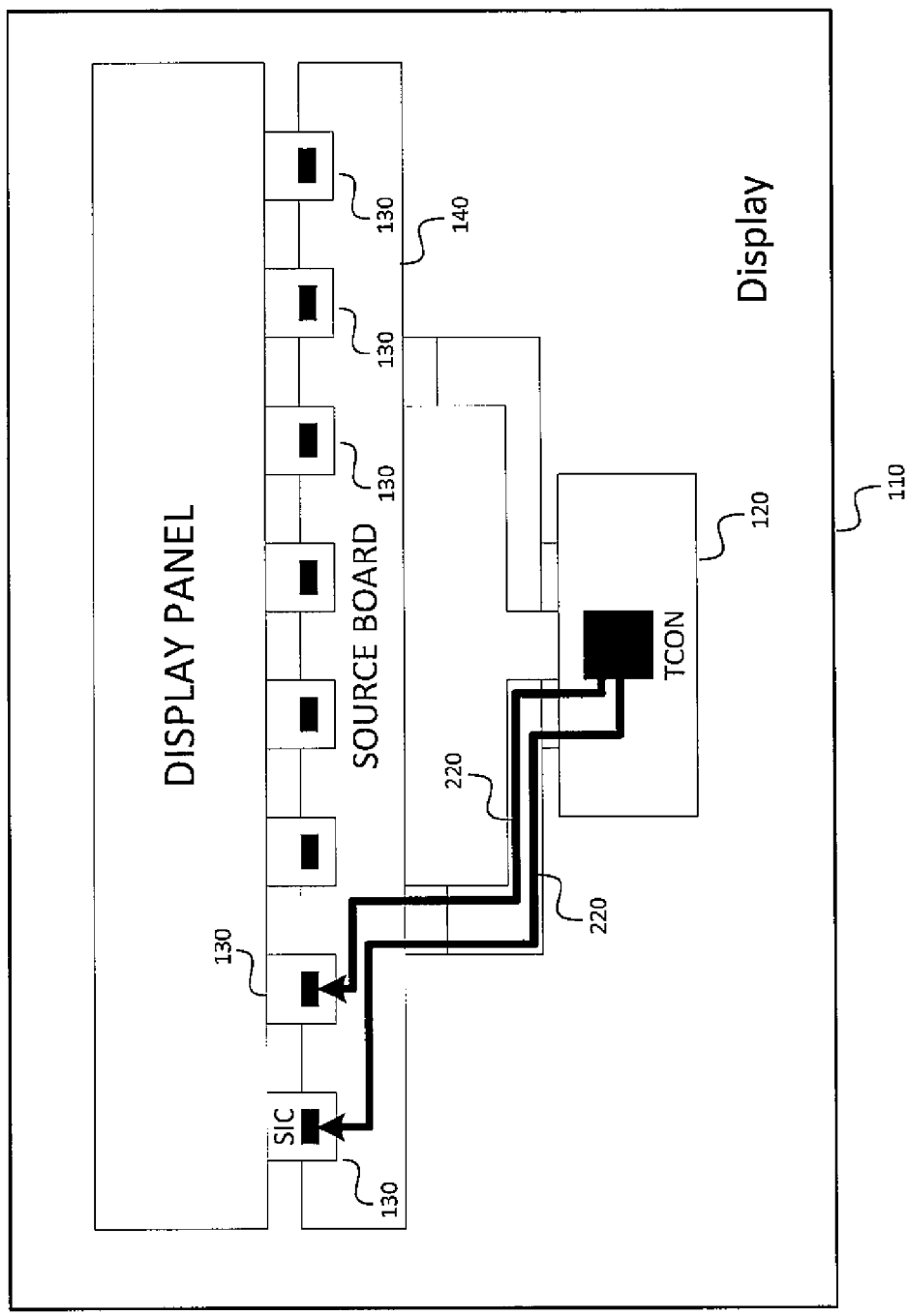
FIG. 1 is a block diagram of a high-end display according to an embodiment of the present invention.

Referring to FIG. 1, in one embodiment, a timing controller (TCON) 120 in a high-end display 110 transmits data to several, e.g., eight, source driver integrated circuits (SICs) 130, at a high data rate, e.g., N bits per second. The SICs 130 may be installed on a source board 140, which may be a rigid or flexible printed wiring board, e.g., a polymer film printed wiring board. A separate data lane 220 (of which two are shown) is used for each SIC 130, and the data capacity of each data lane 220 is N bits per second. If the same configuration were used with a low-end display in which each SIC 130 requires only, e.g., N/2 bits per second to perform its function, then the data lane capacity would be under-utilized. Moreover, in the low-end display, the manufacturing cost would include the cost of providing eight data lanes 220 between the TCON and the eight SICs 130. Here, in embodiments of the present invention, the (high-end or low-end) display is an organic light emitting diode (OLED) display or a liquid crystal display (LCD).

Figure 2:
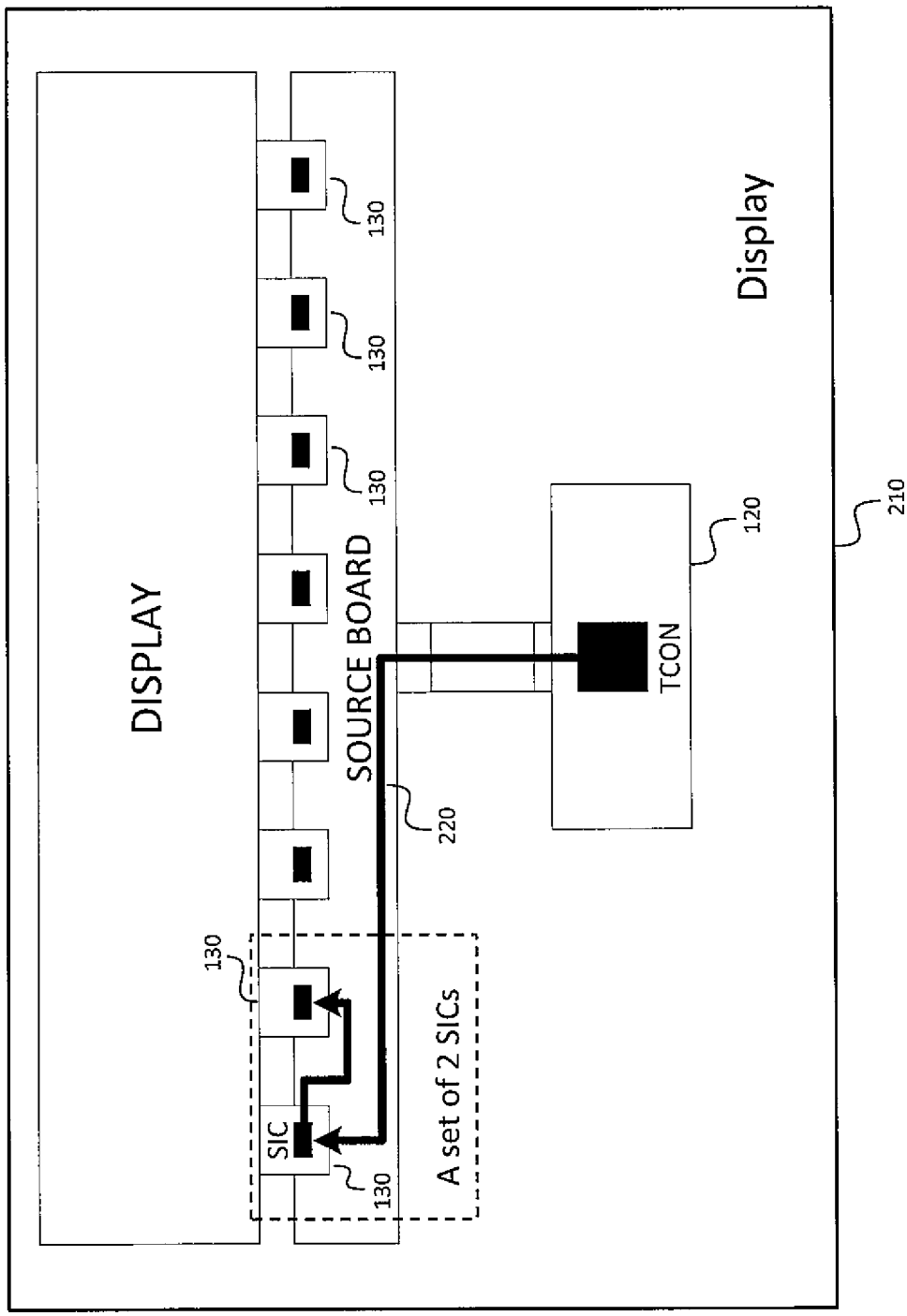
FIG. 2 is a block diagram of a low-end display according to an embodiment of the present invention.

Referring to FIG. 2, in one embodiment of a low-end display 210, a single data lane 220, with a capacity of N bits per second, is used to transmit data from the TCON 120 to a first SIC 130, which uses half of the data, and relays the other half to a second SIC 130. Although only one data lane 220 supplying data to two SICs 130 is shown, an arbitrary number of data lanes 220 may be used, e.g., four data lanes 220 may be used to supply half-rate data to eight SICs 130.

Figure 3:
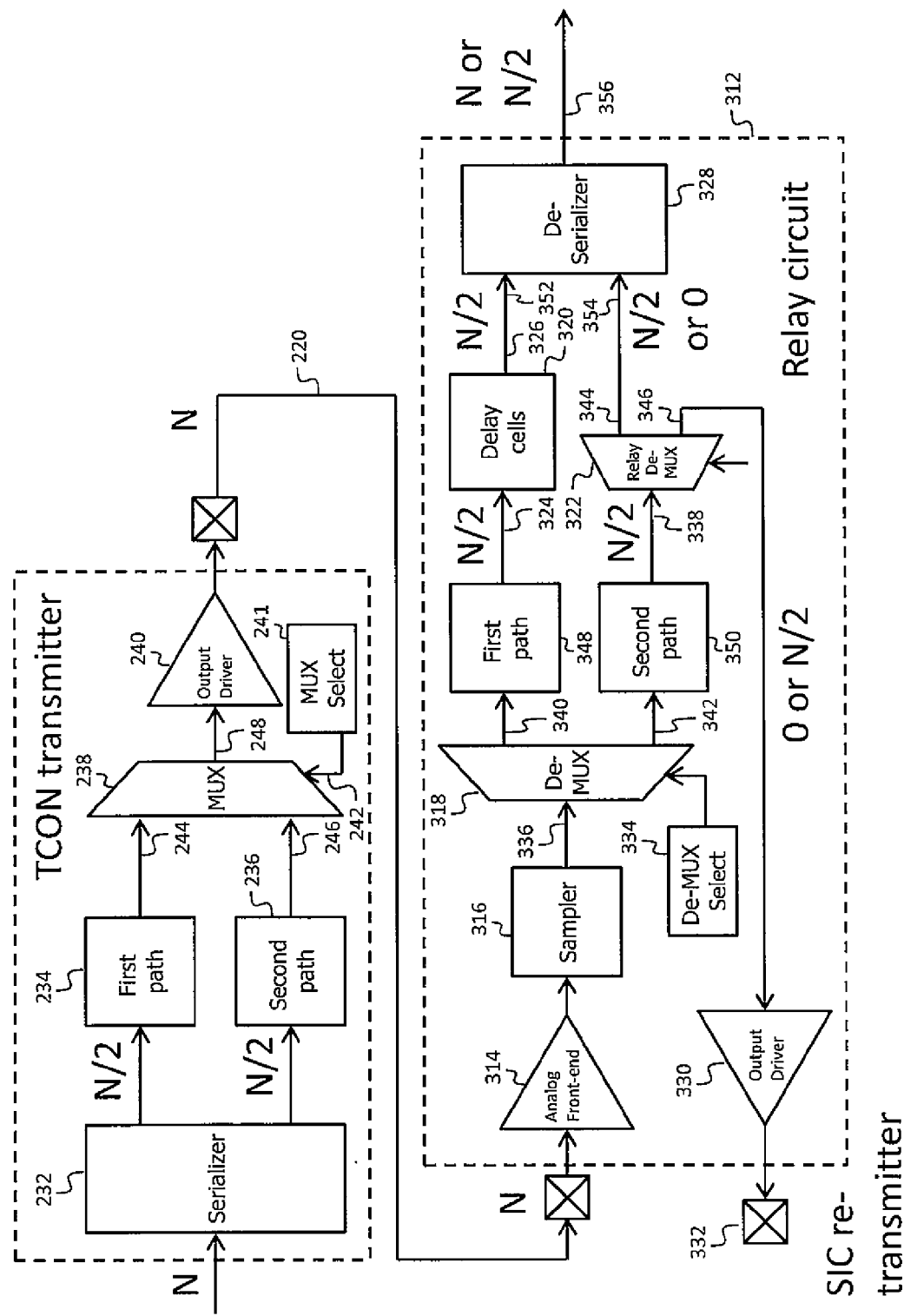
FIG. 3 is a block diagram of a TCON with a SIC according to an embodiment of the present invention.

Referring to FIG. 3, in one embodiment, the TCON may include, at each of its serial data outputs, a TCON transmitter, including a TCON serializer 232, a first TCON data path 234, a second TCON data path 236, a TCON multiplexer 238 and a TCON output driver 240. The TCON serializer 232 receives parallel data at a total data rate of N bits per second from other circuitry in the TCON, and separates it into two paths, the first TCON data path 234, and the second TCON data path 236. The TCON multiplexer 238 then multiplexes the data in the first TCON data path 234 and the second TCON data path 236 into a single serial data stream carrying data at a rate of N bits per second. A select input 242 of the TCON multiplexer 238 controls the operation of the TCON multiplexer 238, which transmits data from either the first input 244 of the TCON multiplexer 238 or the second input 246 of the TCON multiplexer 238 to the output 248 of the TCON multiplexer 238, depending on the logic value, provided by a TCON multiplexer select block 241, at the select input 242 of the TCON multiplexer 238. The serial data are transmitted over the data lane 220 to a first SIC relay circuit 312, which is a circuit at the input of, and inside, a first SIC 130. The first SIC relay circuit 312 includes a first analog front end 314, a first sampler 316, a first data demultiplexer 318, a first programmable delay module 320 (which may include one or more delay cells or programmable delay cells), a first relay demultiplexer 322, a first deserializer 328, a first SIC output driver 330, a first SIC re-transmitter output 332, and a first demultiplexer select block 334. In the first SIC relay circuit 312, the received serial data are first converted to a clean digital data stream, with levels suitable for the digital logic being used and edges synchronized with the local clock, by a first analog front end 314 and a first sampler 316. The first data demultiplexer 318 transmits data from the data input 336 of the first data demultiplexer 318 to either the first output 340 of the first data demultiplexer 318 or to the second output 342 of the first data demultiplexer 318 depending on the logic value, provided by the first demultiplexer select block 334, at the select input of the first data demultiplexer 318. The first output 340 of the first data demultiplexer 318 and the second output 342 of the first data demultiplexer 318 are connected, respectively, to a first data path 348 of the first SIC relay circuit 312 and a second data path 350 of the first SIC relay circuit 312, which are in turn connected, respectively, to a first delay input 324 of the first programmable delay module 320, and to a first relay demultiplexer 322. The first delay output 326 of the first programmable delay module 320 is connected to a first input 352 of the first deserializer 328, and a first output 344 of the first relay demultiplexer 322 is connected to a second input 354 of the first deserializer 328. The second output 346 of the first relay demultiplexer 322 is connected to a first SIC output driver 330 which drives a first SIC re-transmitter output 332. The first relay demultiplexer 322 transmits data from the data input 338 of the first relay demultiplexer 322 to either the first output 344 of the first relay demultiplexer 322 or the second output 346 of the first relay demultiplexer 322, depending on the logic value at the select input of the first data demultiplexer 318. The output 356 of the first deserializer 328 also acts as the data output of the first SIC relay circuit 312 and is connected to other circuitry in the first SIC 130, which uses the data to generate drive signals for pixels in the display.

In operation, data that was transmitted on the first TCON data path 234 is transmitted on the data lane 220 along with (and alternating with) data that was transmitted on the second TCON data path 236. In the first SIC relay circuit 312, the data that was transmitted on the first TCON data path 234 is separated from the data that was transmitted on the second TCON data path 236 by the first data demultiplexer 318, under the control of the first demultiplexer select block 334. In one embodiment, the first demultiplexer select block 334 is synchronized with the TCON multiplexer select block 241 so that data that was transmitted on the first TCON data path 234 is subsequently transmitted on the first data path 348 of the first SIC relay circuit 312 and data that was transmitted on the second TCON data path 236 is subsequently transmitted on the second data path 350 of the first SIC relay circuit 312. The synchronization may be accomplished during an initialization sequence by having the TCON transmitter transmit a designated sequence of bits, which the first demultiplexer select block 334 recognizes and uses to effect synchronization with the multiplexer select block.

In one embodiment, the sampler 316 uses several clock phases of a reduced-rate clock to sample the data received from the analog front end 314, e.g., it may be a DDR or QDR sampler, containing two or four sampler circuits. The sampler may also contain a deserializer. The output of the sampler may then be a data bus including several, e.g., two or four, parallel data lanes. These parallel data lanes are shown as a single line in the drawing, and, in general, each line representing a data path in a drawing herein may, unless otherwise specified, represent a data path one bit wide or it may represent a data bus, i.e., a data path several bits wide. Similarly, two or more parallel lines may represent a bus, with a number of data lanes equal to the total of the number of data lanes represented by each of the parallel lines. Each data rate shown next to a line in one of the drawings herein is an aggregate data rate for all lanes in the data path represented by the line.

Figure 4:
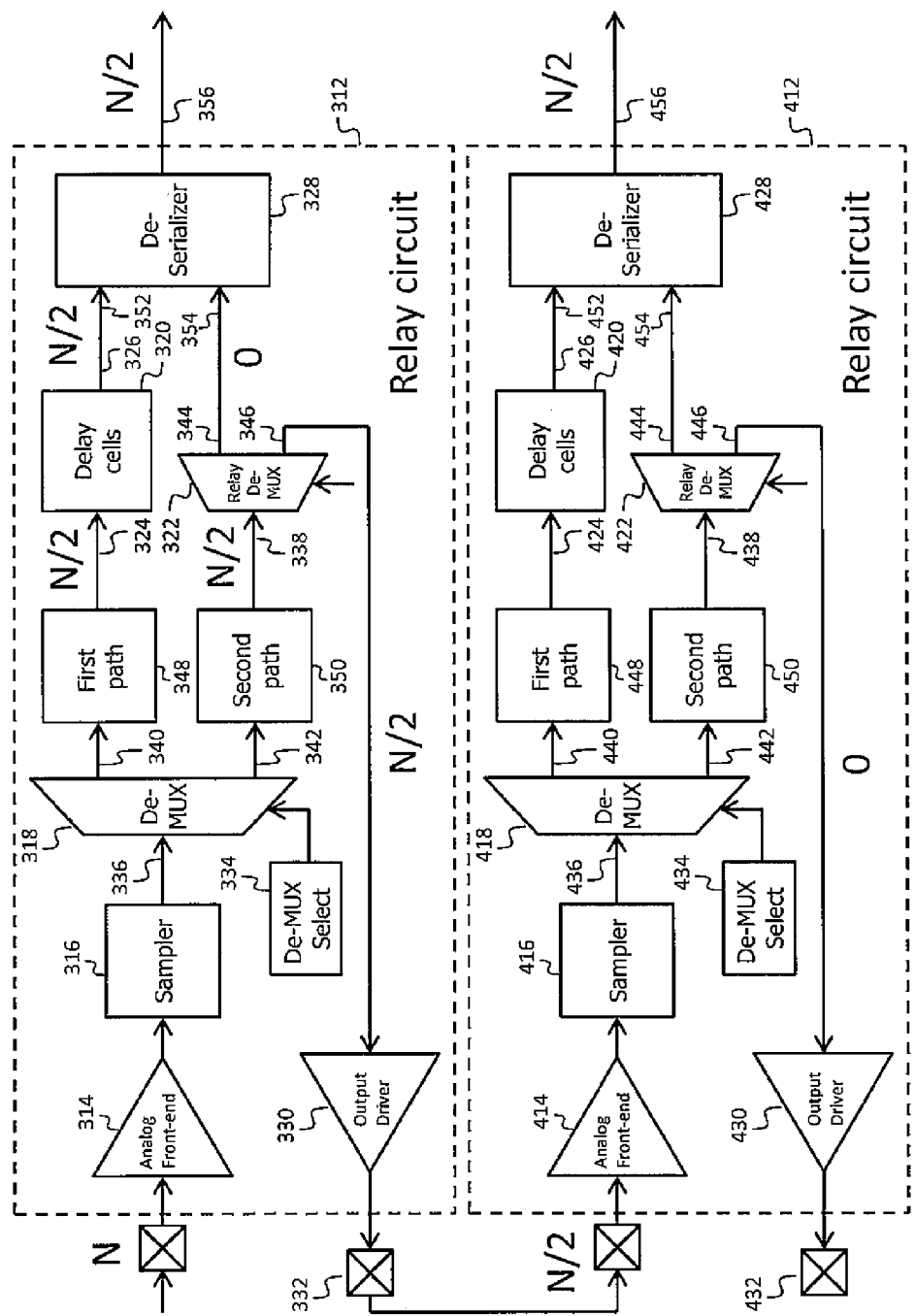
FIG. 4 is a block diagram of a first SIC and a second SIC in a low-end display according to an embodiment of the present invention.

Referring to FIG. 4, in one embodiment, a low-end display includes a first SIC relay circuit 312 and a second SIC relay circuit 412. The second SIC relay circuit 412 includes a second analog front end 414, a second sampler 416, a second data demultiplexer 418, a second demultiplexer select block 434, a first SIC data path, a second SIC data path, a second programmable delay module 420, a second relay demultiplexer 422, a second deserializer 428, a second SIC output driver 430 and a second SIC re-transmitter output 432.

The second SIC relay circuit 412 also includes internal element inputs and outputs analogous to those of the first SIC relay circuit 312, i.e., a second delay input 424, a second delay output 426, a data input 436 of the second data demultiplexer 418, a data input 438 of the second relay demultiplexer 422, a first output 440 of the second data demultiplexer 418, a second output 442 of the second data demultiplexer 418, a first output 444 of the second relay demultiplexer 422, a second output 446 of the second relay demultiplexer 422, a first data path 448 of the second SIC relay circuit 412, a second data path 450 of the second SIC relay circuit 412, a first input 452 of the second deserializer 428, a second input 454 of the second deserializer 428, and an output 456 of the second deserializer 428.

In the first SIC relay circuit 312, the select input of the first relay demultiplexer 322 is set to a logic value that results in the first relay demultiplexer 322 transmitting all of the data received at the data input 338 of the first relay demultiplexer 322 to the second output 346 of the first relay demultiplexer 322. As a result, all of the data transmitted through the second SIC data path is re-transmitted to the second SIC relay circuit 412. In the second SIC relay circuit 412, the select input of the first relay demultiplexer 322 is set to a logic value that results in the second relay demultiplexer 422 transmitting all of the data received at the data input 438 of the second relay demultiplexer 422 to the first output 344 of the first relay demultiplexer 322. As a result, in one example, the first SIC relay circuit 312 sends half (e.g., N/2 bits per second) of the data it receives (at a rate of N bits per second) to the first deserializer 328, and re-transmits the other half to the second SIC relay circuit 412, which sends all of the data it receives to the second deserializer 428. In other embodiments, the proportions may be different, e.g., the first SIC relay circuit 312 may re-transmit more or less than half of the data it receives.

The first programmable delay module 320 may be used to balance delays in the data path to the output 356 of the first deserializer 328 with delays in the data path to the output 456 of the second deserializer 428, which may include delay, for example, in the first relay demultiplexer 322, and various delays in the second SIC relay circuit 412. The first programmable delay module 320 may be a shift register, for example, and a multiplexer selecting an output tap of the shift register corresponding to the desired delay, or it may be an on-chip memory.

The select input of the first relay demultiplexer 322 and the select input of the second relay demultiplexer 422 may be, or may be connected to, respective pins of respective integrated circuits, and they may be configured by being hard-wired (e.g., having corresponding integrated circuit pins soldered to a conductor on a printed wiring board in the display, a conductor that, during operation, carries an appropriate voltage), or they may be set to appropriate logic levels by other circuitry.

The multiplexing performed in the TCON transmitter and the corresponding demultiplexing done in the first SIC relay circuit 312 may be performed according to any of several methods. For example, in the TCON transmitter, alternate bits may be multiplexed from the first TCON data path 234 and from the second TCON data path 236. In other embodiments, alternate bytes (or alternate 16-bit words, or alternate 32-bit words, or alternate words of any length) are multiplexed from the first TCON data path 234 and from the second TCON data path 236, or the number of bits taken from one of the data paths by the TCON multiplexer 238 before switching to the other data path is not constant but varies with time or with an operating state of the display.

Figure 5:
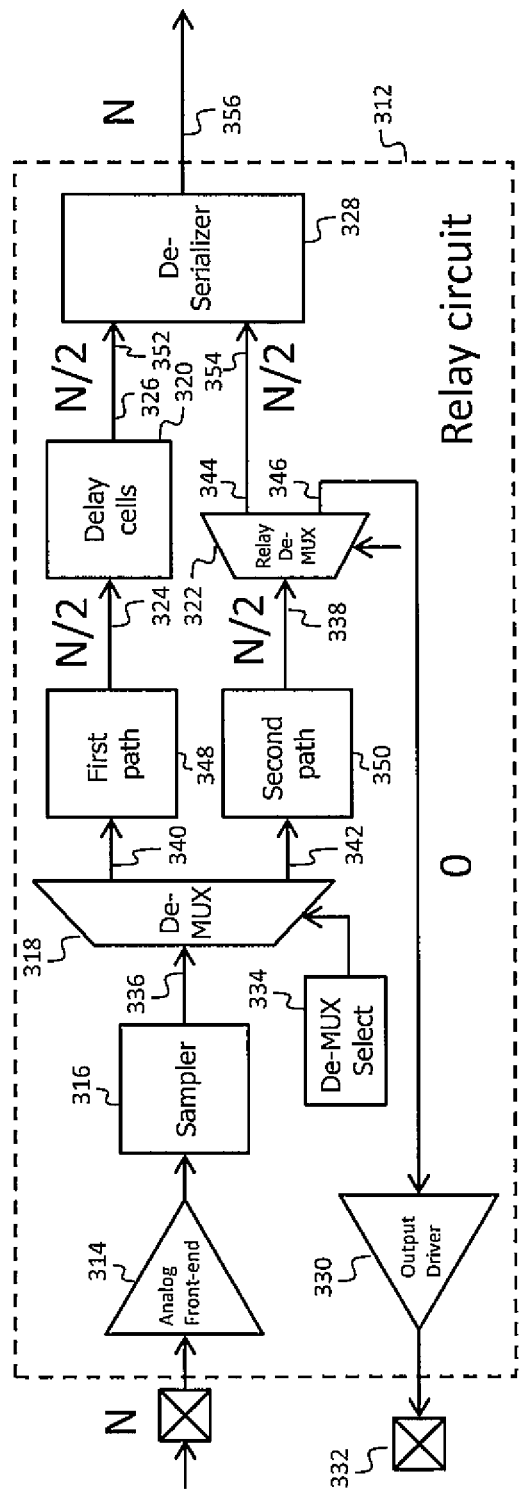
FIG. 5 is a block diagram of a first SIC in a high-end display according to an embodiment of the present invention.

Referring to FIG. 5, in operation in a high-end display, the select input of the first relay demultiplexer 322 may be hard-wired so that the first relay demultiplexer 322 transmits data from the data input 338 of the first relay demultiplexer 322 to the first output 344 of the first relay demultiplexer 322. Thus, none of the data transmitted by the TCON transmitter is relayed by the first SIC relay circuit 312 to another SIC relay circuit; instead, all of the data is transmitted to the first deserializer 328. In one example, the data rate on the data lane 220 is N bits per second. Half of the data (N/2 bits per second) are transmitted on the first data path 348 of the first SIC relay circuit 312 and half of the data (N/2 bits per second) are transmitted on the second data path 350 of the first SIC relay circuit 312. All of the data (i.e., data at a rate of N/2 bits per second) at the input of the first relay demultiplexer 322 are transmitted to the first output 344 of the first relay demultiplexer 322, so that the total data rate received by the first deserializer 328 is N bits per second.

Figure 6:
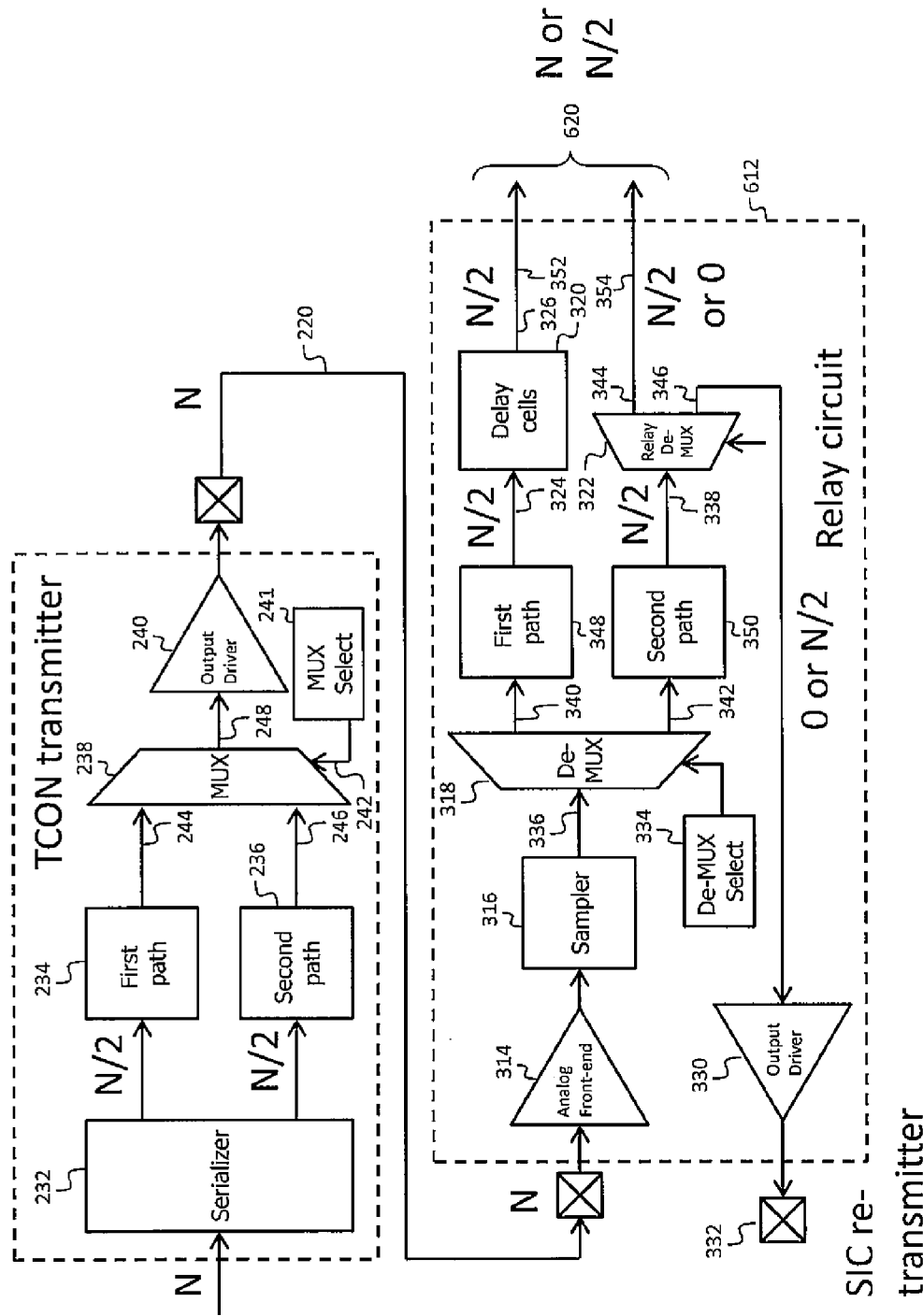
FIG. 6 is a block diagram of a TCON with a SIC according to an embodiment of the present invention.

Referring to FIG. 6, in another embodiment that is a variant of the embodiment of FIG. 3, a relay circuit 612 does not have a separate deserializer at the output. The first delay output 326 of the first programmable delay module 320 and the first output 344 of the first relay demultiplexer 322 are connected directly to the data output 620 of the relay circuit 612. The data transmitted from the output 620 of the relay circuit 612 thus includes the data transmitted on the data path (which may be a single data lane or a bus) from the first programmable delay module 320 and, depending on the setting of the select input of the first relay demultiplexer 322, it may also include data transmitted from the first output 344 (which may also be a single data lane or a bus) of the first relay demultiplexer 322. Similarly, the embodiments illustrated in FIGS. 4-5 may also be modified by removing from each relay circuit a respective deserializer, so that the output of each relay circuit is the collection of data lanes that in the embodiments illustrated in FIGS. 4-5 are inputs to the deserializers.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially", "about", and similar tams are used as terms of approximation and not as terms of degree, and are intended to account for the inherent deviations in measured or calculated values that would be recognized by those of ordinary skill in the art. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system for relayed data transmission in a high-speed serial link have been specifically described and illustrated herein, many modifications and variations will be apparent to those skilled in the art. Accordingly, it is to be understood that a system for relayed data transmission in a high-speed serial link constructed according to principles of the present invention may be embodied other than as specifically described herein. The invention is also defined in the following claims, and equivalents thereof.

What is claimed is:

1. A system for transmitting data, the system comprising a first source driver integrated circuit relay circuit (SIC relay circuit) comprising:
   a first data demultiplexer comprising:
      a data input;
      a select input;
      a first output; and
      a second output,
   the first data demultiplexer being to:
      transmit data from the data input of the first data demultiplexer to either:
         the first output of the first data demultiplexer, or
         the second output of the first data demultiplexer
         depending on a logic value at the select input of the first data demultiplexer;
   a first programmable delay module comprising:
      a first delay input; and
      a first delay output,
   the first delay input being connected to the first output of the first data demultiplexer;
   a data output; and
   a first relay demultiplexer comprising:
      a select input;
      a data input;
      a first output; and
      a second output, the data input of the first relay demultiplexer being connected to the second output of the first data demultiplexer, the first output of the first relay demultiplexer being connected to the data output of the SIC relay circuit, the first relay demultiplexer being to:
transmit data from the input of the first relay demultiplexer to either:
the first output of the first relay demultiplexer, or
the second output of the first relay demultiplexer
depending on a logic value at the select input of the first relay demultiplexer.

2. The system of claim 1, wherein the first SIC relay circuit is to transmit, from the data output of the first SIC relay circuit, data at a rate equal to a data rate of data received at the data input of the first data demultiplexer.

3. The system of claim 1, wherein the first SIC relay circuit is to transmit, from the data output of the first SIC relay circuit, data at a rate less than a data rate of data received at the data input of the first data demultiplexer.

4. The system of claim 3, wherein the first SIC relay circuit is to transmit, from the data output of the first SIC relay circuit, data at a rate equal to one half of the data rate of data received at the data input of the first data demultiplexer.

5. The system of claim 1, wherein the programmable delay module comprises a shift register.

6. The system of claim 1, wherein the programmable delay module comprises an on-chip memory.

7. The system of claim 1, wherein the first SIC relay circuit further comprises a first sampler connected to the input of the first data demultiplexer and a first analog front end connected to the first sampler.

8. The system of claim 7, wherein the first SIC relay circuit further comprises a first SIC output driver connected to the second output of the first relay demultiplexer.

9. The system of claim 8, further comprising a timing controller transmitter (TCON transmitter) connected to the first analog front end.

10. The system of claim 9, wherein the TCON transmitter comprises:
a serializer;
a TCON multiplexer connected to the serializer;
a multiplexer select block connected to the TCON multiplexer; and
a TCON output driver connected to the TCON multiplexer,
the output driver of the TCON transmitter being connected to the first analog front end.

11. The system of claim 1, wherein the first relay demultiplexer comprises a select input, and wherein the first relay demultiplexer is to:
transmit data from the input of the first relay demultiplexer to the first output of the first relay demultiplexer when the select input has a first logic value, and
transmit data from the input of the first relay demultiplexer to the second output of the first relay demultiplexer when the select input has a second logic value different from the first logic value.

12. A printed wiring board comprising an integrated circuit comprising the system of claim 11, wherein the select input of the first relay demultiplexer is hard-wired to a conductor on the printed wiring board, to provide the first logic value or the second logic value.

13. The system of claim 10, wherein the first SIC relay circuit further comprises a first demultiplexer select block to control the first data demultiplexer.

14. The system of claim 13, wherein the TCON is to transmit, during an initialization sequence, a designated sequence of bits.

15. The system of claim 14, wherein the first demultiplexer select block is to receive, and synchronize to, the designated sequence of bits.

16. The system of claim 10, wherein the first SIC relay circuit further comprises:
a first deserializer comprising:
a first input connected to the first delay output;
a second input; and
an output; and
wherein the system further comprises a second SIC relay circuit comprising:
a second data demultiplexer comprising:
a data input;
a select input;
a first output; and
a second output,
the second data demultiplexer being to:
transmit data from the input of the second data demultiplexer to either:
the first output of the second data demultiplexer, or
the second output of the second data demultiplexer
depending on a logic value at the select input of the second data demultiplexer;
a second programmable delay module comprising:
a second delay input; and
a second delay output,
the second delay input being connected to the first output of the second data demultiplexer;
a second deserializer comprising:
a first input connected to the second delay output;
a second input; and
an output;
a second relay demultiplexer comprising:
a select input;
a data input;
a first output; and
a second output,
the data input of the second relay demultiplexer being connected to the second output of the second data demultiplexer,
the first output of the second relay demultiplexer being connected to the second input of the second deserializer,
the second relay demultiplexer being to:
transmit data from the input of the second relay demultiplexer to either:
the first output of the second relay demultiplexer, or
the second output of the second relay demultiplexer
depending on a logic value at the select input of the second relay demultiplexer;
a second sampler connected to the input of the second data demultiplexer; and
a second analog front end,
the first SIC output driver being connected to the second analog front end.

17. The system of claim 16, wherein the first relay demultiplexer is to transmit data from the input of the first relay demultiplexer to the second output of the first relay demultiplexer and the second relay demultiplexer is to transmit data from the input of the second relay demultiplexer to the first output of the second relay demultiplexer.

18. The system of claim 17, wherein the output driver of the TCON transmitter is not directly connected to the second analog front end.

19. A display comprising:
a timing controller (TCON);
a SIC; and
the system of claim 1.

* * * * *